United States Patent [19]
Schneider

[11] Patent Number: 5,651,141
[45] Date of Patent: Jul. 29, 1997

[54] GARMENT AND LANDING NET COMBINATION

[76] Inventor: Jeff D. Schneider, 8005 Colleen, St. Louis, Mo. 63123

[21] Appl. No.: 651,628

[22] Filed: May 22, 1996

[51] Int. Cl.⁶ ........................................................ A45F 4/02
[52] U.S. Cl. .................................................. 2/94; 224/103
[58] Field of Search ................................. 2/94, 102, 108, 2/84, 85, 95; 24/442, 444, 448, 306, 304; 224/103, 901

[56] References Cited

U.S. PATENT DOCUMENTS

| | | |
|---|---|---|
| 1,024,653 | 4/1912 | Sargent . |
| 1,894,192 | 1/1933 | Olson . |
| 2,841,847 | 7/1958 | Wallace . |
| 3,886,508 | 5/1975 | Lavrard ........................... 2/94 X |
| 4,290,174 | 9/1981 | Kalleberg ........................ 24/448 |
| 4,382,302 | 5/1983 | Watson . |
| 4,564,957 | 1/1986 | Scharf . |
| 4,723,695 | 2/1988 | Farber . |
| 4,970,821 | 11/1990 | Young . |
| 5,029,343 | 7/1991 | McIntyre . |
| 5,042,702 | 8/1991 | Douglass . |
| 5,086,516 | 2/1992 | Baxter et al. . |
| 5,465,425 | 11/1995 | Crispin . |
| 5,487,190 | 1/1996 | Thompson . |

*Primary Examiner*—C. D. Crowder
*Assistant Examiner*—Shirra L. Jenkins
*Attorney, Agent, or Firm*—Senniger, Powers, Leavitt & Roedel

[57] ABSTRACT

A garment and landing net combination for use by fishers to withdraw fish from a body of water. The combination comprises a garment, a landing net, and mating fastener halves. One of the halves is attached to the garment and the other is attached to the landing net so the net may be releasably fastened to the garment by engaging the one half with the other. The fastener halves are sized and arranged on the garment and the landing net to permit the landing net to be fastened to the garment in a plurality of orientations and positions. The landing net has a flexible mesh material portion sized for retaining the fish, a frame surrounding the mesh material portion, and a handle extending outward from the frame.

17 Claims, 3 Drawing Sheets

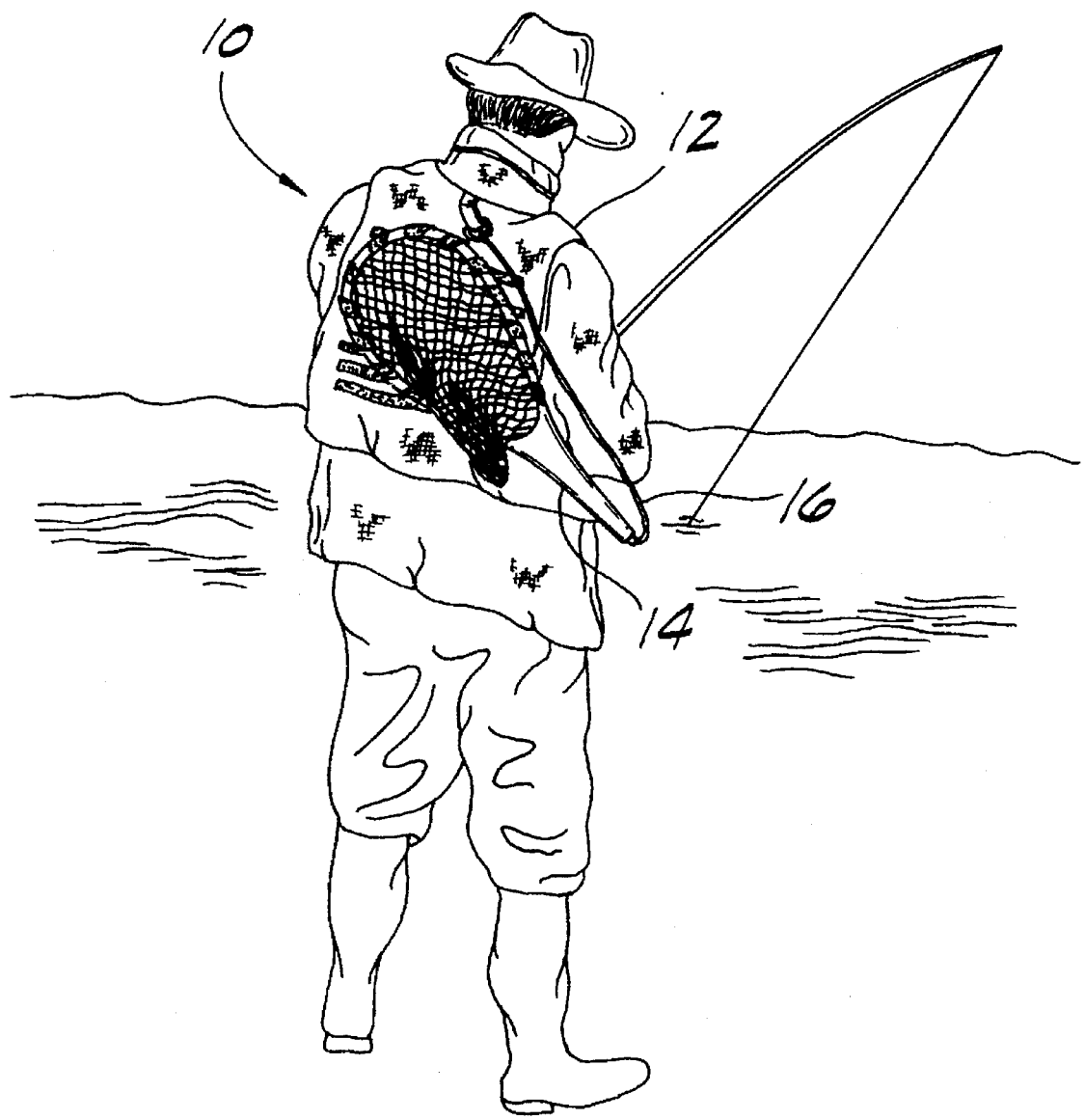

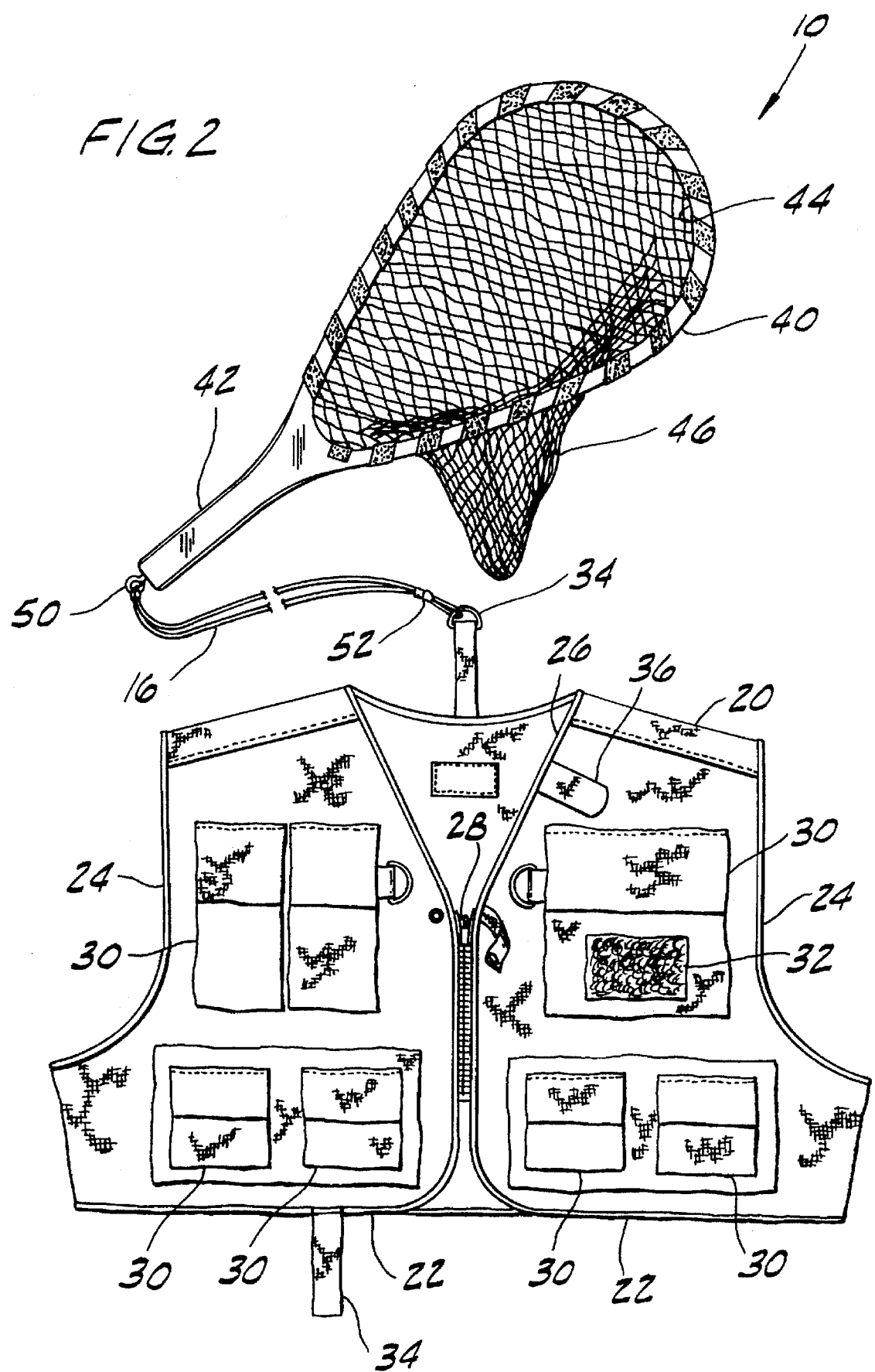

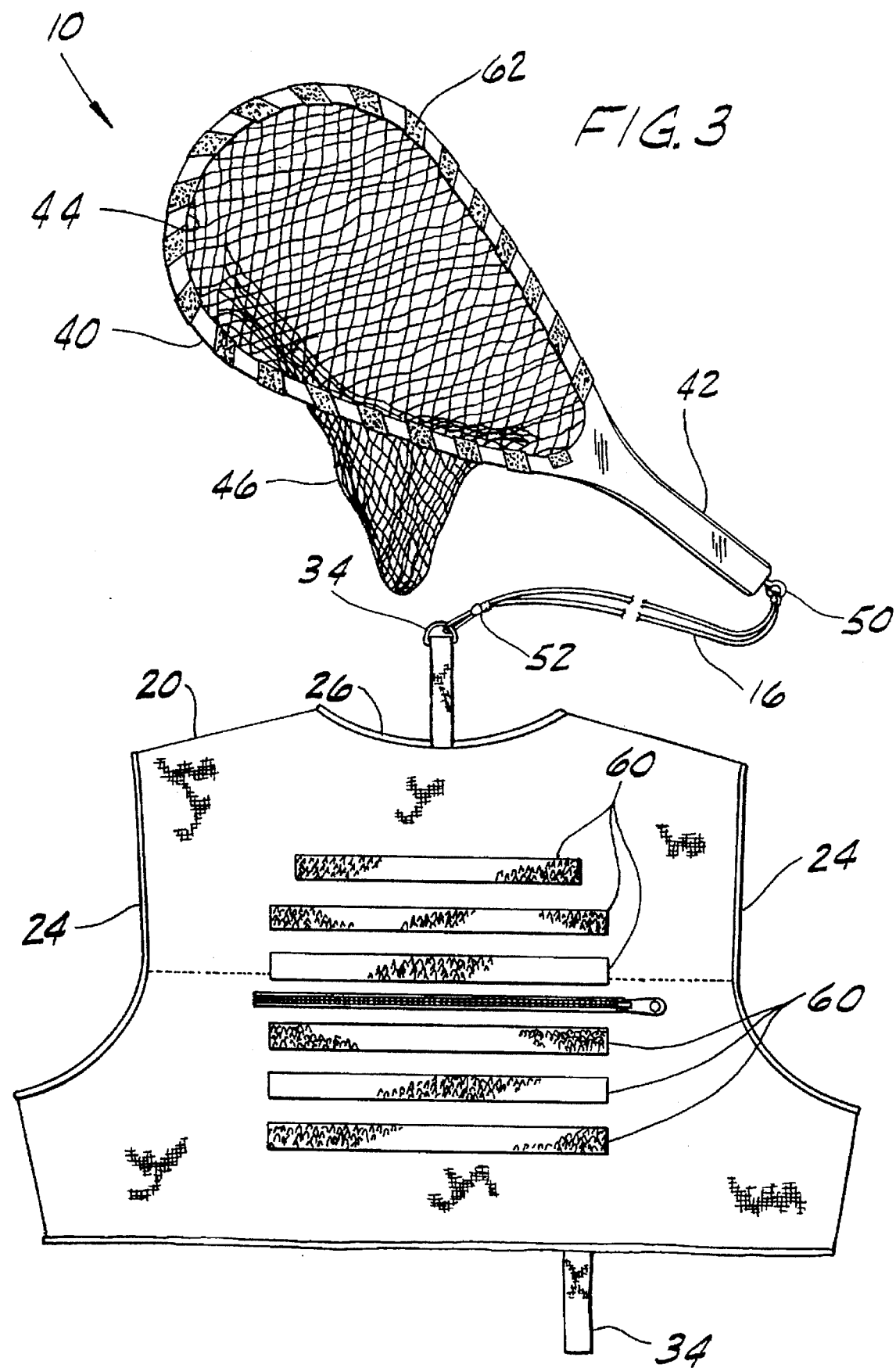

GARMENT AND LANDING NET COMBINATION

BACKGROUND OF THE INVENTION

This invention relates generally to a garment and landing net combination for use by fishers to withdraw fish from a body of water. More particularly, the invention relates to a garment and landing net combination which includes mating fastener halves for releasably fastening the landing net to the garment.

In general, fishing nets are needed to withdraw fish from a body of water once they have been hooked and reeled in. Thus, a fishing net must be kept nearby When fishing. Although the fisher may lay the net down when fishing from land or from a boat, this is not always possible when fishing in a stream or when walking along a shore while fishing. Further, when traveling to a particular site to fish, the fisher frequently must hike for some distance. For convenience, it is best if the net is fastened to the fisher (or to his or her clothing) in some way so it will not be lost and need not be held in the hand while fishing in a stream or walking.

In the past, fishers have tied the fishing net to an article of clothing such as a vest designed for fishing. One such vest has an elastic tether extending from a tab on the back of the vest adjacent the fisher's neck to the fishing net handle. This permits retrieval of the net when needed but keeps the net against the fisher's back where it does not obstruct his or her casting. However, because the net dangles from the tab, it bumps against the fisher during each step and during each cast. Further, when the fisher needs the net, he or she must reach behind his or her back and blindly find the handle of the net so that he or she can retrieve the net for use. Still further, when the fisher is hiking through underbrush to reach a fishing site, the net will sometimes become caught in brush, thereby requiring that the fisher stop and dislodge the net. If the fisher does not dislodge the net, it can hit the fisher with a significant impact when it becomes dislodged due to the elasticity of the tether. Also, the net may become damaged if not dislodged, thereby requiring repair or replacement.

In an effort to solve some of these problems, the tether has been formed as a loop so the net can be captured in the tether loop when hiking to a fishing site. When captured in the loop, the net is raised above most of the brush so it is less likely to become caught and the effective length of the tether is reduced so that the net does not bump against the fisher's back with as great a force when walking. However, experience has shown that the net occasionally becomes dislodged from the loop during a hike thereby requiring that it be reinstalled in the loop to be effective. Further, once the fisher reaches the site, the net must be taken out of the loop so that it is accessible when needed. Thus, the net still bumps the fisher's back during each step and cast, and is somewhat inconvenient to reach when needed.

SUMMARY OF THE INVENTION

Among the several objects and features of the present invention may be noted the provision of a garment and landing net combination which permits convenient access to the landing net; the provision of such a combination which allows convenient and rapid landing net stowage; the provision of such a combination which permits landing net stowage in a plurality of locations and orientations on the garment; the provision of such a combination which holds the handle of the net in a fixed position so that it may be easily located when needed; the provision of such a combination which may be used to temporarily retain fish while freeing the fisher's hands for other tasks; and the provision of such a combination which securely connects the landing net to the garment during transport thereby preventing it from bumping against the fisher.

Briefly, apparatus of this invention is a garment and landing net combination for use by fishers to withdraw fish from a body of water. The combination comprises a garment, a landing net, and mating fastener halves. One of the halves is attached to the garment and the other is attached to the landing net so the net may be releasably fastened to the garment by engaging the one half with the other. The fastener halves are sized and arranged on the garment and the landing net to permit the landing net to be fastened to the garment in a plurality of orientations and positions. The landing net has a flexible mesh material portion sized for retaining the fish, a frame surrounding the mesh material portion, and a handle extending outward from the frame.

Other objects and features of the invention will be in part apparent and in part pointed out hereinafter.

BRIEF DESCRIPTION OF THE DRAWINGS

FIG. 1 is a perspective of a garment and landing net combination of the present invention worn by a fisher;

FIG. 2 is a front elevation of the garment and landing net combination; and

FIG. 3 is a rear elevation of the garment and landing net combination.

Corresponding reference characters indicate corresponding parts throughout the several views of the drawings.

DETAILED DESCRIPTION OF THE PREFERRED EMBODIMENT

Referring now to the drawings and in particular to FIG. 1, the garment and fishing net combination, indicated generally at 10, is of the type worn by fishers when fishing and used to withdraw fish from a body of water.

The garment and landing net combination 10 includes a vest 12 connected to a landing net 14 by an elastic tether 16. As illustrated in FIGS. 2 and 3, the vest 12 is sized to be worn by the fisher around the fisher's torso and includes a back panel 20 joined along its sides to two front panels 22. The back and front panels 20, 22 are joined along their top edges so that arm holes 24 are formed at either side of the vest 12 and a neck 26 is formed at the top of the vest. A zipper 28 is used to releasably fasten the central edges of the front panels 22 to retain the vest 12 on the fisher. Although the garment of the preferred embodiment is a vest, other types of garments are also envisioned as being within the scope of this invention. For instance, the garment may be a jacket, coat, or jumpsuit or virtually any other article of clothing which may be worn by a fisher while fishing.

The vest 12 has numerous pockets 30 for carrying various fishing articles. These pockets 30 have a variety of differing types of closures, such as zippers, buttons, snaps, buckles, and fibrous hook and loop fasteners. Further, the vest 12 has a fleece patch 32 for holding fishing hooks and lures (not shown) when they are not being use. Numerous loops 34 and tabs 36 also extend from the vest 12 for attaching articles such as fishing licenses and stringers (not shown) to the vest. As illustrated, the vest 12 of the preferred embodiment is a Model ER502, Ausable® fishing vest from Amerex (USA) Inc. of New York, N.Y.

The landing net 14 has an egg-shaped frame 40 with a handle 42 extending outward from one end. In the preferred embodiment, the frame 40 and handle 42 are made of bent strips of wood laminated to one another to form a continuous, integral structure. The frame 40 defines an opening 44 sized to permit fish (not shown) to pass through it. A bag 46 made of mesh material or netting is attached to the frame 40. The bag 46 is attached to the frame 40 so that its open end coincides with the opening 44 of the frame. Thus, the open end of the bag is held open by the frame to permit fish to pass into the bag. Fish passing through the frame opening 44 are captured and retained in the mesh material bag 46. The mesh bag 46 is attached to the frame 40 by tying the netting through radially-extending holes (not shown) located around the periphery of the frame as is well known in the art. Materials other than wood may be used to form the frame 40 and handle 42 without departing from the scope of the present invention. Further, the mesh bag 46 may be constructed in any of several well known configurations and made of any of several natural or synthetic fibers. As illustrated, the fishing net 14 of the preferred embodiment is a Model TN-17, Mark III, South Bend® trout net from Maurice Sporting Goods, Inc. of Northbrook, Ill.

An eye 50 is screwed into the end of the handle 42. The tether 16 which connects the net 14 to the vest 12 is looped through the eye 50 and extends to a clasp 52 which may be connected to one of the numerous loops 34 on the vest. In one preferred embodiment, the clasp 52 is connected to the loop 34 on the back panel 20 of the vest adjacent the neck 26. Because the tether 16 is formed as a loop of elastic material, the net 14 may be temporarily stowed by stretching the tether loop over the frame 40 so the net is captured in the loop as previously described. All of the previously described aspects of the vest 12, landing net 14 and tether 16 are conventional and will not be described in further detail.

As best illustrated in FIG. 3, mating fibrous hook and loop fastener strips 60, 62 are attached to the vest 12 and fishing net 14, respectively, for releasably fastening the net to the vest by engaging the fastener strips with each other. Although other types of fastener strips may be used, the fastener strips of the preferred embodiment are VELCRO® fastener strips made by E. I. du Pont de Nemours and Company of Wilmington, Del. Six elongate hook fastener strips 60 are oriented lengthwise across the back panel 20 of the vest 12. As shown in FIG. 3, these strips 60 are horizontally aligned and vertically spaced when the vest 12 is worn by the fisher so the area covered by the strips is approximately equal to or a little larger than the area encompassed by the fishing net frame 40. It is envisioned that a single patch of hook fastener material may be used in place of the fastener strips 60 without departing from the scope of the present invention. A single elongate loop fastener strip 62 is helically wound around the frame 40 of the fishing net 14 (and laced through the mesh of the bag 46) so portions of the strip 62 are present all around the frame and on both sides of the frame. Although winding the strip 62 around the frame 40 improves the mechanical attachment of the strip to the frame, the strip may have other shapes and be attached in other configurations without departing from the scope of the present invention. When the fastener strip 62 on the frame 40 contacts the strips 60 across the back panel 20 of the vest 12, the net 14 and vest are releasably attached to each other. The previously described layout of the fastener strips permits the landing net 14 to be fastened to the vest 12 in an infinite number of orientations and positions. Further, because the fastener strips 60, 62 may be fastened so the frame 40 is fastened to the vest 12 around the entire perimeter of the frame, the vest totally covers the fishing net opening 44 and prevents fish held in the net from escaping through the opening. Still further, because the fastener strip 62 is positioned on both sides of the frame 40, either side of the net 14 may be attached to the vest 12.

To use the garment and fishing net combination 10, the fisher wears the vest 12 and fastens the fishing net 14 to the back panel 20 of the vest by contacting the fastener strip 62 on the net to the fastener strips 60 on the back panel of the vest. When the fisher has caught a fish and wishes to withdraw it from the water, he or she grasps the handle 42 of the fishing net 14 and pulls to unfasten the fastener strips 60, 62 and to release the net 14 from the vest 12. Because the tether 16 is elastic, the fisher may move the net 14 to any position within his or her reach to manipulate the frame opening 44 around the fish to capture the fish in the mesh bag 46. The fisher may then unhook the fish and either release the fish, place it in a basket or on a stringer, or leave the fish in the mesh bag and refasten the fishing net 14 to the back panel 20 of the vest 12. The fastener strips 60, 62 have sufficient strength to prevent separation of the frame 40 from the back panel 20 of the vest so the fish will be retained in the mesh bag 46 if the net is attached to the vest with the fish in the bag.

Because the previously described garment and landing net combination permits the net 14 to be quickly placed on the back of the vest 12 in virtually any orientation and in a variety of positions, very little dexterity is required to fasten the net to the vest. Further, the net is fastened to the back of the vest where it is sufficiently out of the way to prevent it from obstructing the fisher's movements, but conveniently close when needed to withdraw fish from the water. Still further, the previously described combination allows convenient and rapid stowage of the landing net because time need not be taken to align the fasteners when attaching the net to the vest. The combination also permits the fisher to store a captured fish without the need for a basket or stringer by leaving the fish in the mesh bag and fastening the net against his or her back. In addition, the combination permits the landing net to be securely fastened to the garment during transport so that it does not hit the fisher during each movement.

Further, it is envisioned that the fastener strips 60, 62 could be sold as a kit for retrofitting existing fishing vests 12 and landing nets 14. This kit might also include instructions, as well as adhesive and thread for attaching the fastener strips 60, 62 to the vest 12 and net 14. Thus, previously manufactured vests and nets can be modified to include the advantages of the present invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A garment and landing net combination for use by fishers when fishing to withdraw fish from a body of water, said combination comprising:

a garment sized to be worn by a fisher;

a landing net having a flexible mesh material portion sized for retaining said fish, a frame surrounding the mesh material portion and defining an opening through which the fish travel when entering the net for retention in the mesh material portion, and a handle extending outward from the frame for gripping said net and maneuvering the opening over the fish to position the fish within the mesh material portion; and mating fastener halves, one of said halves being attached to the garment and the other of said halves being attached to the landing net so that the net may be releasably fastened to the garment by engaging said one half with said other half, the fastener halves being sized and arranged on the garment and the landing net to permit said landing net to be fastened to the garment in a plurality of orientations and positions.

2. A combination as set forth in claim 1 wherein said fastener halves comprise mating fibrous hook and loop fastener halves.

3. A combination as set forth in claim 2 wherein the garment includes a back portion adapted to overlie the fisher's back and the fastener halves are sized so that at least a portion of said one fastener half will engage with at least a portion of said other fastener half thereby fastening the landing net to the garment when said frame and garment back portion are positioned in parallel planes and a substantial portion of the frame is brought into contact with the back portion.

4. A combination as set forth in claim 3 wherein said one fastener half generally extends over more than approximately fifteen percent of said garment back portion and said other fastener half generally extends along more than fifty percent of said landing net frame.

5. A combination as set forth in claim 3 wherein said one fastener generally extends over approximately thirty percent of said garment back portion and said other fastener half generally extends along approximately one hundred percent of said landing net frame.

6. A combination as set forth in claim 1 wherein said other fastener half extends along said landing net frame to permit the net to be fastened to the garment with the frame held closely adjacent said garment so that the garment covers the opening to prevent fish retained in said mesh material portion from escaping through said opening when the mating fastener halves are engaged with each other and the landing net is fastened to the garment.

7. A combination as set forth in claim 1 further comprising a tether extending between said net and garment for preventing separation of the net from the garment thereby preventing loss of the net when the mating fastener halves are disengaged from one another.

8. A garment and landing net combination for use by fishers when fishing to withdraw fish from a body of water, said combination comprising:

a garment sized to be worn by a fisher so that the garment overlies the fisher's back;

a landing net having a mesh material portion sized for retaining said fish, a frame surrounding the mesh material portion, and a handle extending from the frame for gripping the net; and mating halves of fibrous hook and loop fasteners, one of said halves being attached to the garment so that it overlies the fisher's back when the garment is worn by the fisher, the other of said halves being attached to the landing net so that the net may be releasably fastened to the garment adjacent the fisher's back by contacting the mating halves to each other.

9. A combination as set forth in claim 8 wherein said one fastener half extends over an area of said garment which is larger than said landing net frame.

10. A combination as set forth in claim 9 wherein said other fastener half extends along said landing net frame so that the net opening is adapted to be held adjacent said garment to prevent fish retained in said mesh material portion from escaping from said net when the landing net is fastened to said garment.

11. A combination as set forth in claim 10 wherein said landing net frame has first and second sides and said other fastener half extends over each of said first and second sides thereby permitting the landing net to be fastened to said garment with either of the first and second sides adjacent the garment.

12. A combination as set forth in claim 11 wherein said other fastener half comprises an elongate fastener strip helically wound along the frame of the landing net.

13. A combination as set forth in claim 12 wherein said one fastener half comprises a fibrous loop fastener strip and said other fastener half comprises a fibrous hook fastener strip.

14. A combination as set forth in claim 13 wherein said one fastener half comprises a plurality of elongate fastener strips extending horizontally across said garment when worn by said fisher, said strips being vertically spaced over said garment when worn by said fisher.

15. A combination as set forth in claim 8 further comprising a tether extending between said net and garment for preventing separation of the net from the garment.

16. A combination as set forth in claim 15 wherein said tether is elastic.

17. A combination as set forth in claim 8 wherein said garment is a vest.

* * * * *